United States Patent [19]

Koulogeorgas

[11] Patent Number: 5,137,556

[45] Date of Patent: Aug. 11, 1992

[54] STEAM CONDENSATE DRAINAGE DEVICE FOR A STEAM PIPING SYSTEM

[75] Inventor: Paris Koulogeorgas, Vernon Hills, Ill.

[73] Assignee: Accu-Flow Tech, Inc., Addison, Ill.

[21] Appl. No.: 713,676

[22] Filed: Jun. 11, 1991

[51] Int. Cl.⁵ .......................... B01D 46/02; F15D 1/02
[52] U.S. Cl. ........................................ 55/466; 55/190; 137/549
[58] Field of Search .................. 55/190, 191, 466; 137/549; 138/41, 44

[56] References Cited

U.S. PATENT DOCUMENTS

| | | | |
|---|---|---|---|
| 2,760,826 | 8/1956 | Allenbaugh | 137/549 X |
| 3,200,834 | 8/1965 | Pape | 137/549 X |
| 3,877,895 | 4/1975 | Wonderland et al. | 55/466 X |
| 3,893,473 | 7/1975 | Breece | 137/171 |
| 4,171,209 | 10/1979 | Brown | 55/466 |
| 4,426,213 | 1/1984 | Stavropoulos | 55/466 |
| 4,478,238 | 10/1984 | Maddox et al. | 137/549 X |
| 4,486,208 | 12/1984 | Stavropoulos | 55/466 |
| 4,541,456 | 9/1985 | Troy | 137/549 |
| 4,592,381 | 6/1986 | Troy | 137/203 |
| 4,745,943 | 5/1988 | Mortensen | 137/177 |
| 4,919,710 | 4/1990 | Seki et al. | 55/466 X |
| 5,049,170 | 9/1991 | Parnoff | 55/466 X |

Primary Examiner—Robert Spitzer
Attorney, Agent, or Firm—Silverman, Cass Singer, Ltd.

[57] ABSTRACT

A steam condensate removal device, typically for return of steam condensate to a boiler, is provided. A receptacle attached to the steam condensate removal line contains a gasket-separator and a threaded condensate restriction nozzle therein and a cap attached thereto to form a chamber housing the gasket-separator and nozzle. Condensate passes from the steam line, through the nozzle into the chamber and then on to the boiler return line. The device incorporates within it features that prevent seizing of the nozzle or the cap.

13 Claims, 3 Drawing Sheets

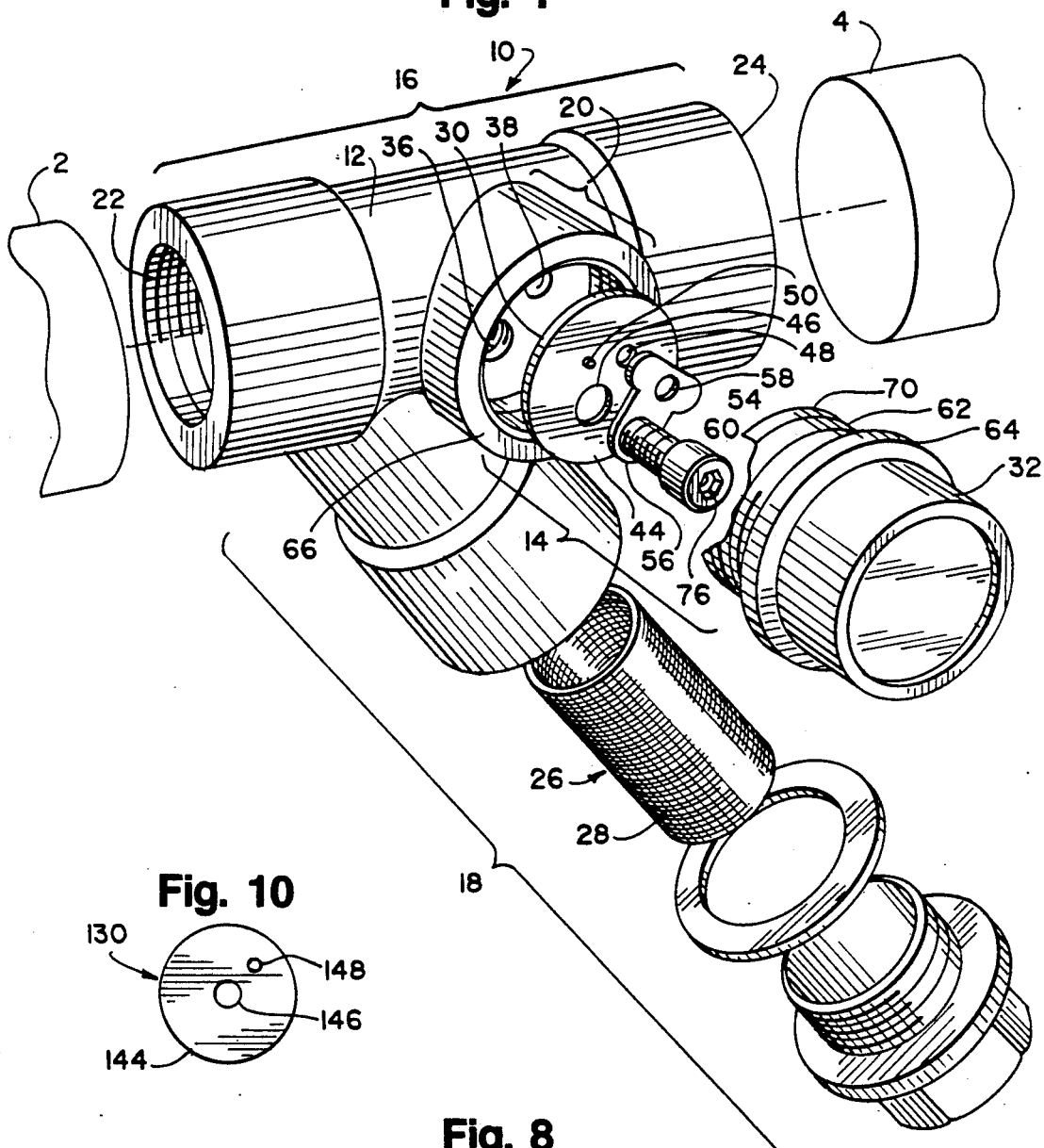
Fig. 1
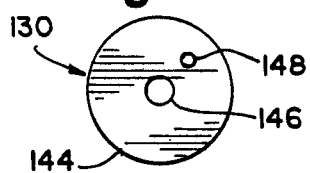
Fig. 10
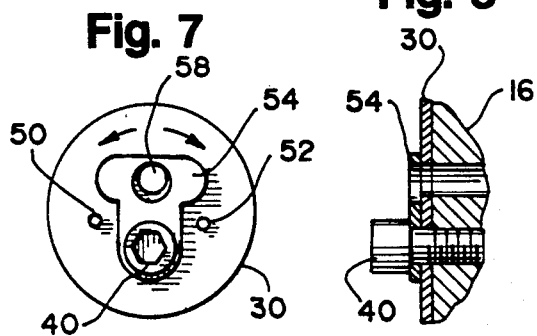
Fig. 7
Fig. 8

STEAM CONDENSATE DRAINAGE DEVICE FOR A STEAM PIPING SYSTEM

FIELD OF THE INVENTION

This invention relates generally to devices for draining steam condensate from steam piping systems. More particularly, this invention relates to an improved condensate removal device having a fixed orifice and novel means for adjusting the condensate drainage capacity of the device.

BACKGROUND OF THE INVENTION

In a typical steam piping system, devices are provided for draining steam condensate which accumulates in the steam line as heat is lost from the steam. Such devices generally are well known as exemplified by the U.S. Pat. Nos. 4,171,209, 4,426,213 and 4,486,208. In U.S. Pat. No. 4,171,209, the condensate removal device features an orifice plate formed unitarily in the body of a fitting which can be connected directly into the steam line, preferably downstream from a conventional Y-strainer. The small orifice in the plate is required to be drilled of a fixed length and diameter. Thus a multiplicity of variously drilled bodies of fittings are utilized to accommodate variation in steam pressures.

In U.S. Pat. Nos. 4,426,213 and 4,448,208, the disadvantages of the device of U.S. Pat. No. 4,171,209 are overcome by providing the body of the fitting with a fixed length and diameter bore into which a separate tubular nozzle can be installed for constricting fluid flow through the device. The tubular nozzle had a varying internal diameter configuration along its length and a terminal flange formation to correctly position the nozzle in the bore. Interchangeable tubular nozzles could be provided varying in diameter and length of the constriction for service in a range of steam pressures. The body of the device was standard, as was the bore configuration with the nozzle device made available as a separate item. However, once the nozzle was installed, the system was set for a given steam pressure. For a different steam pressure operation, the entire body with the nozzle had to be replaced with a different nozzle installation for accommodating operation for a different steam pressure.

SUMMARY OF THE INVENTION

The condensate drainage device embodying the invention comprises a modular system which includes a main body which can be permanently connected into the steam piping system, a gasket-separator member which fits into the main body and forms an intermediate chamber therein and a novel nozzle device which can be removably threaded into the main body through said gasket-separator member. Tightening up on the nozzle device forms a seal with the gasket-separator such that a fluid such as condensate and/or steam can only pass along a designated flow path which include the intermediate chamber in the body and a passageway in both the nozzle device and the gasket-separator. The nozzle device is readily replaced with a different nozzle device without requiring disconnection of the main body from the piping system or displacement of the gasket-separator.

The gasket-separator also is adjustable for varying the passageway therethrough for different steam pressure operating requirements. Further, the gasket of the gasket-separator serves to prevent seizing of the nozzle device in the main body by preventing egress of steam or condensate to the threads of the nozzle device.

BRIEF DESCRIPTION OF THE DRAWINGS

FIG. 1 is an exploded perspective view of a Y-strainer assembly typically used in a steam condensate removal line of a steam piping system and including an embodiment of the steam condensate drainage device according to the invention;

FIG. 7 is an elevational view of an adjustment means for varying drainage capacity of the condensate drainage device of the invention;

FIG. 8 is a partial sectional view taken through the device of FIG. 7;

FIG. 10 is an elevational view of a modified embodiment of gasket separator which does not employ bosses.

DESCRIPTION OF THE PREFERRED EMBODIMENTS

Figure 2:
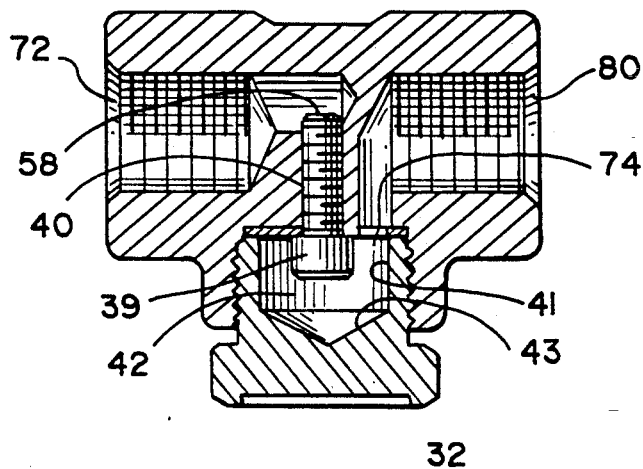
FIG. 2 is a transverse sectional view taken through the Y-strainer assembly of FIG. 1 and showing the device embodying the invention in section.

Referring to FIG. 1, a steam condensate removal line with which a steam condensate drainage device embodying the invention is used is represented generally by reference character 10. A mixture of condensate liquid and some steam is directed under generally high pressure from a pipe 2 into a Y-strainer assembly 12 designated generally from left to right to exit into a pipe represented by character 4. The steam condensate drainage device embodying the invention is designated generally by the reference character 14. The Y-strainer assembly 12 has main body 16, a first or strainer arm 18 integrally formed and at an angle with the main body and a second arm or receptacle 20 integrally formed with main body 16 which receptacle contains the elements of the steam condensate drainage device embodying the invention. Receptacle 20 is preferably perpendicular to a plane defined by pipes 2 and 4, main body 16 and strainer arm 18. In operation, the condensate/steam mixture from pipe 2 flows through main body inlet 22 into strainer basket 26 through strainer basket wall 28, through a threaded condensate drain nozzle 40 and a gasket-separator 30 which both embody the invention, and finally exits main body outlet 24 into pipe 4, typically for delivery to a steam boiler (not shown).

The gasket-separator 30 of the invention, as shown in FIG. 1, comprises gasket 44 having a drain nozzle opening 46, drain passageway 48 and raised bosses 50 (shown) and 52 (not shown). Gasket-separator openings 46 and 48 are the same size as main body 16 openings 36 and 38, respectively, and are congruent with openings 36 and 38 when the gasket-separator is in place. The bosses restrict the movement of adjustment tab 54 which overlies the gasket-separator 30 as in FIG. 1. Adjustment tab 54 has a drain condensate nozzle opening 56 and a drain passageway opening 58. Tab 54 opening 56 has the same diameter as openings 36 and 46. The diameter of tab opening 58 is slightly larger than the diameter of opening 48 in order that condensate flow from chamber 42 will not be impeded in normal operation as further described below.

In an alternate embodiment of the invention shown in FIG. 10, a gasket-separator 130 comprising gasket 144, drain nozzle opening 146 and drain passageway 148 is used in place of gasket-separator 30 of FIG. 1. (Gasket-separator 130 thus lacks the bosses 50 and 52 found on gasket-separator 30.) The use of adjustment tab 54 is optional with the use of either gasket-separator 30 or 130. In general, the adjustment tab 54 whose use is explained more fully below in reference to FIG. 7, is used with gasket-separator 30 and is not used with gasket-separator 130.

Figure 5:
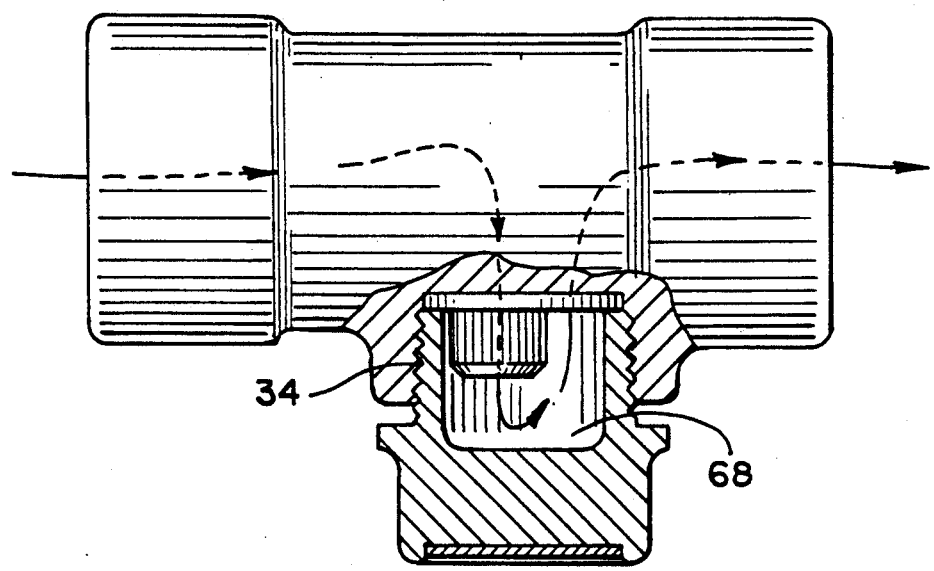
FIG. 5 is a side elevational view of the device of FIG. 2 or FIG. 3 with portions broken away to show the steam flow path therethrough.
Figure 6:
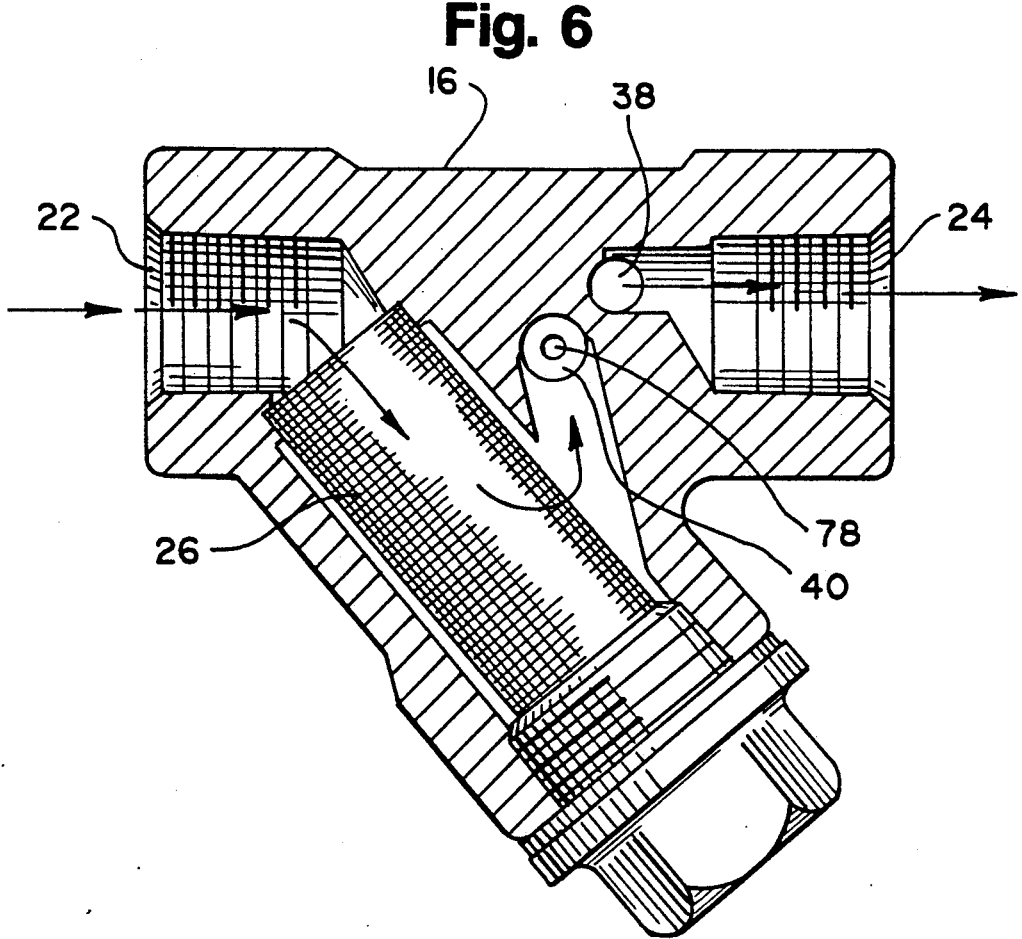
FIG. 6 is a side elevational view of the assembly of FIG. 1 with portions broken away to show the steam flow therethrough.

The gasket-separator 30 fits within receptacle 20 between the main body 16 and cap 32 to form a chamber 42 as is more fully described in FIG. 2 below. Chamber 42 houses all the functional and replaceable components comprising the invention. Receptacle 20 extends a distance from main body 16, has a threaded interior wall 34, as seen in FIG. 5, extending a distance from the proximal end of the receptacle toward the main body. Within receptacle 20, main body 16 has a threaded opening 36 to receive a threaded condensate drain nozzle 40 and a drain passageway opening 38 which connects chamber 42 and a drain passageway opening 38 which connects chamber 42 to the outlet side of main body 16.

When assembling the condensate device as shown in FIG. 1, torque applied to nozzle 40 causes the shoulder 60 of nozzle 40 to form a seal with tab 54 and tab 54 in turn forms a seal with gasket-separator 30. The nozzle applies pressure to the gasket-separator, either by direct contact with the gasket-separator or by indirect contact by means of the adjustment tab and separates the steam side of the device from the condensate side even if cap 32 is removed. In turn, gasket-separator 30 forms a seal with the wall of main body 16. The result of the seals between the nozzle shoulder, adjustment tab, gasket-separator and main body is that the condensate (and/or steam) can only pass through inlet 22 to chamber 42 through passageway 78 within nozzle 40. Passageway 78 is shown in detail in FIG. 4.

Cap 32 is a hexagonal nut assembly having a threaded outer wall 62, a shoulder 64 for sealing to receptacle proximal face 66 and a hollow interior 68, as seen in FIG. 5, extending a distance from the distal face 70 of cap 32 into cap 32 such that when cap 32 is threaded into receptacle 20 and is in its operating position, chamber 42 is formed. The cap 32 forms chamber 42 on the condensate or low pressure side of nozzle 40. The cap 32 is required to form a seal only on the low pressure or condensate side. Nozzle 40 forms the seal separating the high pressure side of nozzle 40 from the low pressure side.

FIG. 2 is a transverse sectional view taken through the Y-strainer assembly of FIG. 1 and illustrates the alternative embodiment of the invention which uses gasket-separator 130 without adjustment tab 54. In FIG. 2. Shoulder 60 of the threaded drain nozzle 40 forms a seal with gasket-separator 30 such that condensate and/or steam can only pass through inlet 72 to chamber 42 through a longitudinal passageway 78 located within nozzle 40. The seal also prevents any fluid within cap 32 from egressing chamber 42 and corroding the thread of nozzle 40. When cap 32 is threaded into place, face 70 of cap 32 forms a circumferential seal with gasket-separator 30, thereby preventing condensate or steam within chamber 42 from leaking into the threaded connection between cap 32 and receptacle 20 threaded wall 34, and simultaneously creates chamber 42. Condensate and/or steam which enters chamber 42 is drained from the chamber through drain passage 74 and exits the steam condensate removal device into condensate return pipe 4. When the device embodying the invention is in operation, the inlet 72 will have a pressure P72, chamber 42 will have a pressure P42 and outlet 80 will have a pressure P80, where P72 is greater than P42 and P42 is greater than P80.

It is important in using condensate removal devices that the discharge of condensate, or more accurately the discharge a steam/condensate mixture or condensate only, through nozzle 40 be observed and/or tested in order to determine if the nozzle installed in the steam condensate removal line is performing at its maximum efficiency. The maximum operating efficiency of an entire heat transfer unit will be achieved when the discharge through nozzle 40 consists almost entirely of condensate accompanied with only a trace of steam. The discharge of steam represents a loss of energy and must be kept to a minimum. A trace loss of steam, however, guarantees that all of the condensate is being removed immediately and completely, and insures thatthe heat transfer unit somewhere in the steam line is operating at maximum possible efficiency. When the gasket-separator of the invention is utilized, on-site testings and replacements or modifications of components can be achieved by removing cap 32. If the results of the tests do not conform to the condensate/steam discharge just described, the design of the gasket-separator device of the invention makes it simple to replace the nozzle in the device with a different nozzle more suitable for the particular heat transfer equipment in use.

Figure 4:
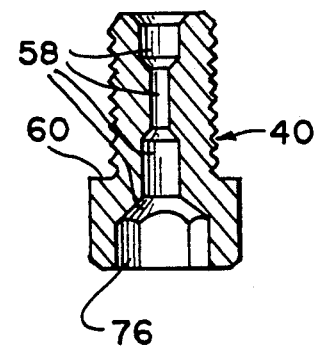
FIG. 4 is a medial, longitudinal sectional view taken through the nozzle device of the invention.

Referring now to FIG. 4, the threaded drain condensate nozzle 40 has an outside body design, with a shoulder 60, similar to a Hexagon or Spline Socket 76 Head Cap screw and a longitudinal passageway 78 as shown. FIG. 4 shows that the Hexagon Socket 76 forms the last and exiting passageway portion of the drain nozzle passageway 78, and provides a means of applying torque for installing nozzle 40 to main body 16 through openings 56, 46 and 36 of adjustment tab 54, gasket 44 and main body 16, respectively.

Figure 3:
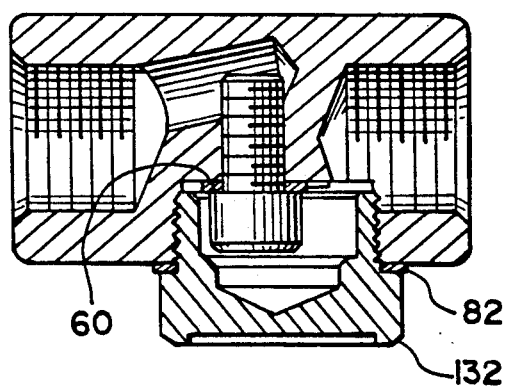
FIG. 3 is a view similar to that of FIG. 2, but showing a gasket-separator of a different construction.
Figure 9:
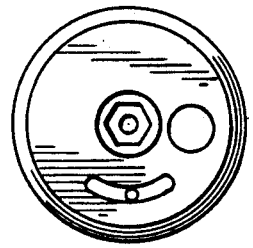
FIG. 9 is an elevational view of another embodiment of an adjustment means for varying drainage capacity of the device embodying the invention.

Referring to FIG. 3, which employs washer type gasket 82, the design will function in the same manner as the gasket-separator of the invention; but when cap 132 is removed, washer 80 is apt to become lost or damaged and possibly unable to be reinstalled. The gasket-separator of the invention eliminates these problems. As shown in FIGS. 1 and 2, the gasket-separator of the invention is captured in place by threaded drain condensate nozzle 40. When cap 32 is removed, the gasket-separator 30 of the invention remains in place. If, after testing, it is determined that the nozzle in place must be replaced by a different nozzle, the in-place nozzle is unscrewed and removed from main body and gasket-separator openings 36 and 46 respectively. The gasket-separator, which is located with receptacle 20 generally stays in place. Once the in-place nozzle is removed and a new nozzle inserted in openings 36 and 46, the chance of gasket-separator loss is eliminated and the possibility of damage minimized.

Referring to FIG. 7, the adjustment tab 54 is a simple and effective device for regulatory flow from chamber 42. The design shown in FIG. 7 incorporates a small stamping having tab drain passage and tab drain nozzle passage 56. Tab 54 is installed under the head of nozzle 32. The tab is placed so that its drain opening 58, which is a slightly larger opening than gasket-separator 30 drain passage 38, will not impede the flow of condensate from chamber 42. A torque is then applied to the nozzle to keep the tab in place. The position of tab 54 as shown in FIG. 7 is the normal position. If, upon testing, it is determined that the performance of the system may be improved by marginally reducing the condensate drainage capacity of the drainage device of the invention, the user may loosen nozzle 40 so that tab 54 can be rotated, insert a gauge pin of the desired diameter through openings 58, 48 and 38, rotate the tab clockwise or counterclockwise to the maximum extent permitted by the gauge pin, apply torque to nozzle 40 to keep the tab in place and remove the gauge pin. The nozzle 40 holds tab 54 in place at whatever opening cross-sectional area is selected.

The result of the above adjustment is that opening 58 and opening 48 together form an eye-shaped opening of smaller cross-sectional area than opening 48. This reduction of cross-sectional area provides additional condensate drainage restriction through the eye-shaped opening thus formed. The adjustment is particularly useful when additional condensate removal restriction is required to increase unit heat transfer efficiency, but no drain nozzle having a longitudinal passage smaller than that of the nozzle in-place is available. As a result of the condensate flow restriction by tab adjustment, the pressure P42 within chamber 42 will increase.

The condensate drainage capacity of the nozzle 40 is directly proportional to the size of the orifice of a given design and the pressure differential P72−P42. Since, the size and design of the nozzle remains the same (no change), the drainage capacity is only affected by the change in pressure differential, P72−P42.

Actually, the two openings 58 and 48 can be shifted to such an extent that they are completely out of alignment as to become totally closed. The adjustment range is thus not limited in terms of condensate drainage capacity reduction. It is only limited in that use of the adjustment tab cannot increase the condensate drainage capacity of the device.

In actual practice, the condensate drainage capacity from chamber 42 will not be allowed to become totally eliminated. For this reason, it is desirable to limit the condensate drainage capacity reduction so that it cannot be reduced to zero. Accordingly, two protruding bosses 50 and 52 will limit the rotation of the tab. The bosses are positioned and the tab is sized such that maximum rotation of the tab does not completely eliminate drainage from chamber 42. These bosses 50 and 52 may be added by inserting pins into press-fit openings in the gasket-separator 30. The bosses may be produced at a substantially lower cost by shear punching protrusions as shown in FIG (7).

Alternatively, the opening 58 maybe replaced by a long cylindrical drain hole (not shown), having substantially increased wear surface, and attached to the tab. Similarly, a long cylindrical drain opening may be fashioned in the exact same manner to replace the drain opening 38.

The gasket-separator of the invention has a number of distinct and important advantages over known condensate removal devices. In addition to the washer loss problem discussed above, the gasket-separator of the invention provides functional and cost saving features. For example, the design of the device provides a high degree of latitude in the selection of the materials of the main body 16 and cap 32. That is, materials suitable for the main body and cap are not restricted to highly corrosion resistant materials, such as stainless steel, as is the case with other condensate removal devices. Instead, suitable materials for the device of the invention can be cheaper and more widely available materials such as carbon steel or a suitable grade of chrome-molybdenum steel for high temperature applications. Cheaper and more widely available materials may be used because the gasket-separator of the invention minimizes corrosion, especially corrosion on cap 32 threads as explained below.

Yet another advantage of the device of the claimed invention is that the main body 16 of the device and the inlet and outlet pipes 2 and 4 may be made of the same material since the device of the claimed invention permits a wider selection Of materials to be used in its construction. Consequently, when the device of the invention is welded into a condensate line, it is easier to achieve a sound weld.

In selecting the materials for construction of condensate removal devices, corrosion is a major factor. In particular, thread corrosion is a major problem because it results in 'seizing' which makes it difficult or impossible to loosen or remove threaded parts such as cap 32. Often, when a threaded part seizes, the only available option is to cut the entire unit containing the threaded part out of the line and install a new unit. This is costly in both the down time and the labor and materials necessary to affect the replacement.

FIG. 2 indicates that when cap 32 of the claimed invention is in the operational position, the face 70 of cap 32 forms a circumferential seal with gasket-separator 30 such that the corrosive condensate/steam mixture present in chamber 42 is prevented from reaching the threaded areas of cap 32 and receptacle 20. As a result of the seal between the cap and the gasket-separator, the seizing problem is greatly abated, if not eliminated.

Thread corrosion may be further reduced by application of a rust preventive and non-seizing compound, such as a high temperature grease, to the threads. As shown above, the design of the gasket-separator on the invention prevents any pressure within chamber 42 from communicating to the region of the mating between the threads of the cap and the main body. Consequently, the grease with the thread area is not subjected to breakdown of washout by the corrosive fluid within chamber 42. As a result, even after extended use, the cap 32 may generally be easily removed.

The embodiments described and shown in the drawings are illustrative of the invention, but do not indicate limitation upon the scope of the invention. Variations in the size, location and structural features of cooperating parts, and in material used, may occur to the skilled artisan without departing from the crux of the invention. For example, the drainage opening in the tab may be elongated instead of circular. Similar variations are contemplated within the scope of the invention which is set forth in the appended claims.

I claim:

1. A device for drainage of live steam from a steam piping system with minimized passage of live steam wherein said device is a modular system comprising a main body member having a conduit therethrough provided with an inlet and outlet, a receptacle having an internally threaded wall integrally formed at an angle with the main body and in the flow line of a fluid through the main body member, a gasket-separator member which fits into the receptacle, a nozzle member which can be removable threaded into the main body through the gasket-separator and which form a seal with the gasket-separator, and an externally threaded cap member which can be removably threaded into the receptacle thereby forming a chamber within the receptacle.

2. The device according to claim 1 having an adjustment tab movably mounted between the gasket-separator member and the nozzle, the tab having an opening whereby positioning of said tab opening restricts fluid flow through said gasket-separator.

3. The device according to claim 2 wherein the gasket-separator has a means for restricting the movement of the adjustment tab about a face of said gasket-separator.

4. The device according to claim 1 wherein said cap and said gasket-separator form a seal, the seal thereby preventing a fluid within the device from having contact with the threads of the receptacle and cap.

5. A device for draining condensate from a steam piping system which includes a hollow main body member having a steam passageway therethrough extending from opposite open ends thereof installed in said system and including a pair of openings in one wall thereof communicating with said steam passageway, said device including:

(a) a receptacle member secured on said body member overlying said pair of openings, said receptacle member having a threaded interior wall extending a distance from the proximal end of said receptacle toward the main body;

(b) a gasket-separator installed in said receptacle having a pair of openings aligned with said openings in the wall of said body;

(c) a nozzle member removably secured in one of said wall openings through one of said gasket-separator openings, said nozzle member having a longitudinally extending fluid restriction passageway therethrough, and communicating at one end thereof with said steam passageway; and (d) a cap member having an externally threaded portion for securing the cap member to said threaded receptacle, said cap member removably secured to said receptacle and forming an internal chamber therewith;

(e) said nozzle having an opposite end opening into said chamber and being in sealing engagement with said gasket-separator opening;

(f) whereby steam entering said body member will flow through said nozzle into said chamber and pass into said main body through the second openings of the gasket-separator and said one wall.

6. The device according to claim 5 having an adjustment tab member movably mounted between the gasket-separator member and the nozzle, the tab member having an opening whereby positioning of said tab opening restricts fluid flow through said gasket-separator.

7. The device according to claim 6, wherein the gasket-separator has means for restricting the movement of the adjustment tab about a face of said gasket-separator.

8. The device according to claim 5 wherein said cap and said gasket-separator forms a seal, the seal thereby preventing a fluid within the device from having contact with the threads of the receptacle and cap.

9. A device for drainage of condensate from a steam piping system with minimized loss of steam comprising a gasket-separator member and a drain nozzle member having a longitudinal passageway throughout which nozzle fits through said gasket-separator and can be threaded into a steam line or portion thereof, said nozzle and gasket-separator being sealed to said steam line or portion thereof such that condensate can egress said steam line or portion thereof only through the longitudinal passageway within said nozzle.

10. The device according to claim 9 wherein said nozzle and said gasket-separator sealably separate a high pressure and a low pressure side of said nozzle.

11. The device according to claim 10 having an adjustment tab member mounted between the gasket-separator member and the nozzle, the tab member having an opening whereby positioning of said tab opening restricts fluid flow through said gasket-separator.

12. A device for separating the inlet and outlet sides of a steam condensate return line, said device comprising a gasket-separator member having a nozzle opening and a drain opening; a nozzle having a longitudinal passageway throughout which nozzle passes through said gasket-separator nozzle opening and is removably threaded into the inlet side of the condensate return line and forming a seal with said gasket separator such that condensate may exit the inlet side of the condensate line only through the nozzle opening; and a cap circumferentially sealing said gasket-separator to said condensate line and forming a chamber between said inlet and outlet sides of said steam condensate line whereby condensate entering the chamber through said nozzle exits the chamber through the gasket-separator drain opening and an opening in the outlet side of said condensate return line.

13. The device according to claim 12 having an adjustment tab member mounted between the gasket-separator and the nozzle, the tab member having an opening whereby positioning of said tab opening restricts fluid flow through said gasket-separator.

* * * * *